(12) United States Patent
Goia (10) Patent No.: US 12,503,619 B2
(45) Date of Patent: Dec. 23, 2025

(54) CONCENTRATED DISPERSIONS OF UNIFORM SILVER NANOPARTICLES AND METHODS FOR PREPARING THE SAME

(71) Applicant: NOBEL /NOBLE ELEMENTS/ LLC, Cheyenne, WY (US)

(72) Inventor: Dan Goia, Flemington, NJ (US)

(73) Assignee: NOBEL/Noble Elements/LLC, Cheyenne, WY (US)

( * ) Notice: Subject to any disclaimer, the term of this patent is extended or adjusted under 35 U.S.C. 154(b) by 734 days.

(21) Appl. No.: 17/784,793

(22) PCT Filed: Apr. 1, 2021

(86) PCT No.: PCT/US2021/025428
§ 371 (c)(1),
(2) Date: Jun. 13, 2022

(87) PCT Pub. No.: WO2021/211305
PCT Pub. Date: Oct. 21, 2021

(65) Prior Publication Data
US 2023/0001475 A1    Jan. 5, 2023

Related U.S. Application Data

(60) Provisional application No. 63/010,481, filed on Apr. 15, 2020.

(51) Int. Cl.
*C09D 11/52*   (2014.01)
*B22F 1/0545*  (2022.01)
(Continued)

(52) U.S. Cl.
CPC ............ *C09D 11/52* (2013.01); *B22F 1/0545* (2022.01); *B22F 9/24* (2013.01); *B22F 2301/255* (2013.01);
(Continued)

(58) Field of Classification Search
CPC .... B22F 1/0545; B22F 9/24; B22F 2301/255; B22F 2304/05; B82Y 40/00; C08J 2305/02; C08J 3/07
See application file for complete search history.

(56) References Cited

U.S. PATENT DOCUMENTS

2013/0323115 A1* 12/2013 Goia ................. B22F 1/054
420/501

FOREIGN PATENT DOCUMENTS

| KR | 10-2017-0013133 A | 2/2017 |
| RU | 2602534 C2 | 11/2016 |
| WO | 2009131603 A2 | 10/2009 |

OTHER PUBLICATIONS

Office Action dated May 22, 2024 in Canadian Patent Application No. 3, 160,265.
(Continued)

*Primary Examiner* — Coris Fung
*Assistant Examiner* — Tienna Marie Deroy
(74) *Attorney, Agent, or Firm* — Rimon P.C.

(57) ABSTRACT

Provided herein are compositions comprising concentrated dispersions of silver nanoparticles. Also provided herein are methods of preparing concentrated dispersions of silver nanoparticles. Such a method includes preparing a dextran solution comprising silver or silver ions, preparing a silver precursor solution, and mixing the silver precursor solution with the dextran solution under conditions for a rapid reaction wherein the pH is above about 9 and the temperature above about 40 degrees Celsius, thereby forming the concentrated dispersion of silver nanoparticles.

5 Claims, 7 Drawing Sheets

(51) Int. Cl.
*B22F 9/24* (2006.01)
*B82Y 40/00* (2011.01)
(52) U.S. Cl.
CPC ....... *B22F 2303/01* (2013.01); *B22F 2304/05* (2013.01); *B82Y 40/00* (2013.01)

(56) References Cited

OTHER PUBLICATIONS

Office Action dated Jul. 19, 2024 in European Patent Application No. 21789116.7.
Shen et al., "Preparation of solid silver nanoparticles for inkjet printed flexible electronics with high conductivity," Nanoscale, vol. 6, Issue 3, Nov. 2014, pp. 1622-1628.
Li et al., "Synthesis of Monodisperse, Quasi-Spherical Silver Nanoparticles with Sizes Defined by the Nature of Silver Precursors," Langmuir, vol. 30, No. 9, Feb. 17, 2014, pp. 2498-2504.
Carre-Rangel et al., "Green Synthesis of Silver Nanoparticles: Effect of Dextran Molecular Weight Used as Stabilizing-Reducing Agent," Journal of Nanoscience and Nanotechnology, vol. 15., No. 12, Dec. 1, 2015, pp. 9849-9855.
Davidovic et al., "Impregnation of cotton fabric with silver nanoparticles synthesized by dextran isolated from bacterial species Leuconostoc mesenteroides T3," Carbohydrate Polymers, vol. 131, Jun. 17, 2015, pp. 331-336.
International Search Report and Written Opinion received in corresponding International Application No. PCT/US2021/025428, mailed on Jun. 30, 2021, 8 pages.
Andreescu et al., "A simple route for manufacturing highly dispersed silver nanoparticles", Journal of Materials Research, 22 (9), Sep. 1, 2007 (Sep. 1, 2007), p. 2488-2496.
Extended European Search Report received in EP Application No. 21789116.7, mailed Aug. 11, 2023, 14 pages.
Lundahl et al., "Synthesis and characterisation of monodispersed silver nanoparticles with controlled size ranges", Micro & Nano Letters, 2008, vol. 3, No. 2, pp. 62-65.
Office Action received in CA Application No, 3,160,265, mailed Jun. 5, 2023, 5 pages.
Wenbin et al., "Fabrication of Stable Silver Nanoparticles through a Green Approach", IEEE, 2013, pp. 1307-1310.

* cited by examiner

Low Mw  High Mw

FIG. 3A

Low Mw  High Mw

CONCENTRATED DISPERSIONS OF UNIFORM SILVER NANOPARTICLES AND METHODS FOR PREPARING THE SAME

CROSS REFERENCE TO RELATED APPLICATION(S)

This application claims the benefit of U.S. Provisional Application No. 63/010,481, filed Apr. 15, 2020, which is incorporated by reference in the disclosure of this application.

BACKGROUND

Due to increasing use in electronics, catalysis, bio-imaging, solar cells, ink-jet printing, glass and ceramic staining, spectroscopic research, and antimicrobial applications, there is a growing interest in developing simple and cost-effective methods to generate small, uniform, and well dispersed silver nanoparticles.

BRIEF SUMMARY OF THE DISCLOSURE

The preparation method disclosed in this application surprisingly yields concentrated dispersions of uniform, highly dispersed nanoparticles. The size of the silver nanoparticles can be customized (e.g., ranging in size from 15-60 nm, inclusive) using dextrans of different molecular weight as reducing/dispersing agents.

In an aspect, provided herein is a method of preparing a concentrated dispersion of silver nanoparticles, comprising:
preparing a dextran solution comprising silver or silver ions;
preparing a silver precursor solution; and
mixing the silver precursor solution with the dextran solution under conditions for a rapid reaction wherein the pH is above about 9 and temperature above about 40 degrees Celsius, thereby forming the concentrated dispersion of silver nanoparticles.

In some embodiments, each of the silver nanoparticles has a size within 30% of a size of each of the other silver nanoparticles in the dispersion.

In some embodiments, each of the silver nanoparticles has a size within 20% of a size of each of the other silver nanoparticles in the dispersion.

In some embodiments, the dextran solution comprises dextran of a selected molecular weight suitable to obtain silver nanoparticles of a selected size range.

In some embodiments, the silver precursor solution comprises silver nitrate ($AgNO_3$).

In another aspect, provided herein is a concentrated dispersion of silver nanoparticles wherein each of the silver nanoparticles in the dispersion has a size within 30% of a size of each of the other silver nanoparticles in the dispersion.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DEXTRANS

Dextrans find many applications in medicine where they are used as antithrombotic agents, blood viscosity reducers, and as volume expanders in hypovolaemia. Dextran 70 is included in the WHO's 'Model List of Essential Medicines' needed in any health system. More relevant from the point of view of this patent application is the fact that in biomedical applications dextran is effective in protecting metal nanoparticles from oxidation and improving biocompatibility. Dextrans, particularly the higher molecular weight representatives of the class, are also known as effective dispersing agents. For all these reasons, dextrans are excellent candidates as reducing dispersants in the preparation of silver nanoparticles for biomedical uses.

Glucose, the building block of dextrans, has a reducing character due to the presence of the aldehydic group in the molecule. In acidic and neutral conditions its redox potential is slightly positive (+0.050V), which makes it a mild reductant inadequate for converting efficiently and completely silver ions to metallic silver (Eq. 1).

$$C_6H_{12}O_7 + 2H^+ + 2e^- \rightarrow C_6H_{12}O_6 + H_2O \quad E°=+0.05V \qquad (Eq.\ 1)$$

In alkaline medium the redox potential drops to approximately −1.00V and glucose becomes a strong reducing agent. Glucose can undergo, in appropriate conditions, progressive oxidation of all six C atoms, releasing 12 electrons per molecule (Eq. 2).

$$C_6H_{12}O_6 + 6OH^- \rightarrow 6HCOOH + 12e^- + 6H^+ \qquad (Eq.\ 2)$$

For this reason, glucose is an efficient reductant for silver ions in alkaline medium, as one molecule can reduce up to 12 silver ions (Eq. 3).

$$C_6H_{12}O_6 + 12Ag^+ + 6OH^- \rightarrow 12Ag° + 6HCOOH + 6H^+ \qquad (Eq.\ 3)$$

Figure 2:
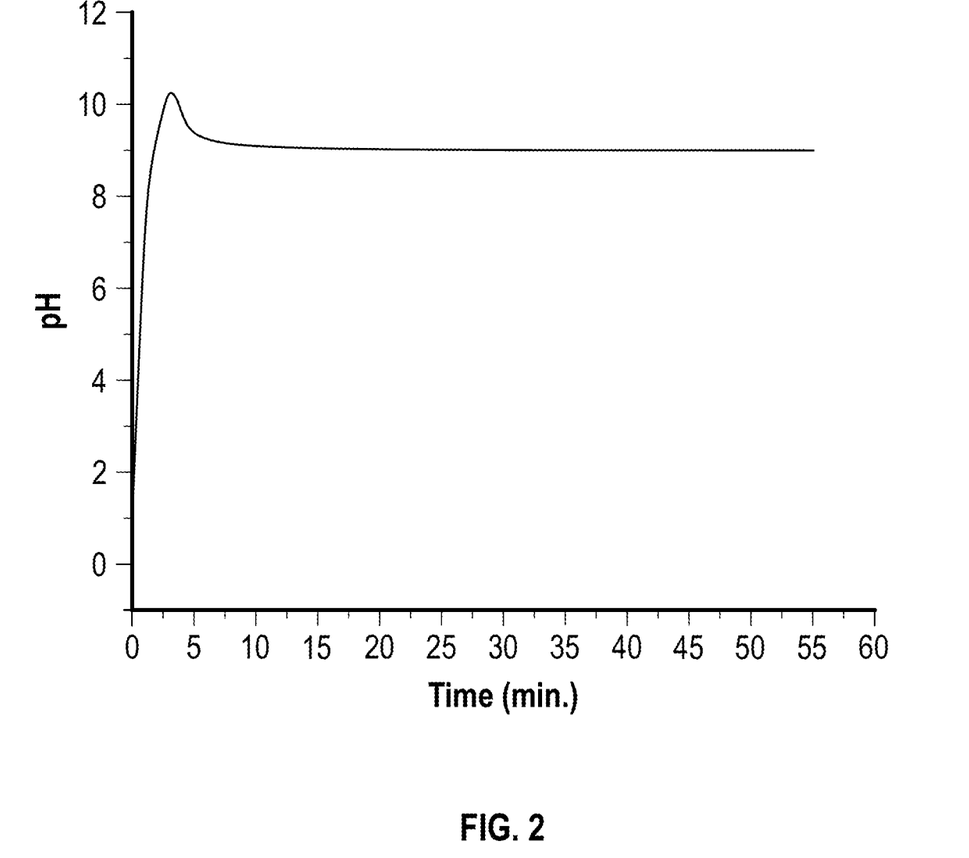
FIG. 2 shows pH conditions for the reduction of silver with sugars.

As indicated by Eq. 3, the glucose oxidation is accompanied by both a consumption of hydroxyl ions and a release of protons. Consequently, the pH decreases gradually in the system and the reduction may stop before all silver ions are reduced. It has been previously demonstrated by the author[15] that the silver ions will not be reduced by dextrose (a sugar molecule with identical reducing properties) unless the pH is above 9.5 (FIG. 2). It was also shown that in order to have a faster reduction that leads to a faster nucleation and the formation of Ag nanoparticles, the pH has to be significantly higher than this value (preferably above 12.5).

The control of pH is even more critical when attempting to produce concentrated dispersions of Ag since the pH drop can be very large. At a silver concentration of 1.0% (0.1 mol/L), for example, sufficient protons are released to cause the pH to drop from 12.0 to less than 8.0 during the reduction. It is imperative that a high pH is maintained throughout the reduction to ensure a complete silver reduction. This can be achieved either by adding an excess of base, by providing buffering conditions that maintain a high pH throughout the reduction, or both.

Figure 1:
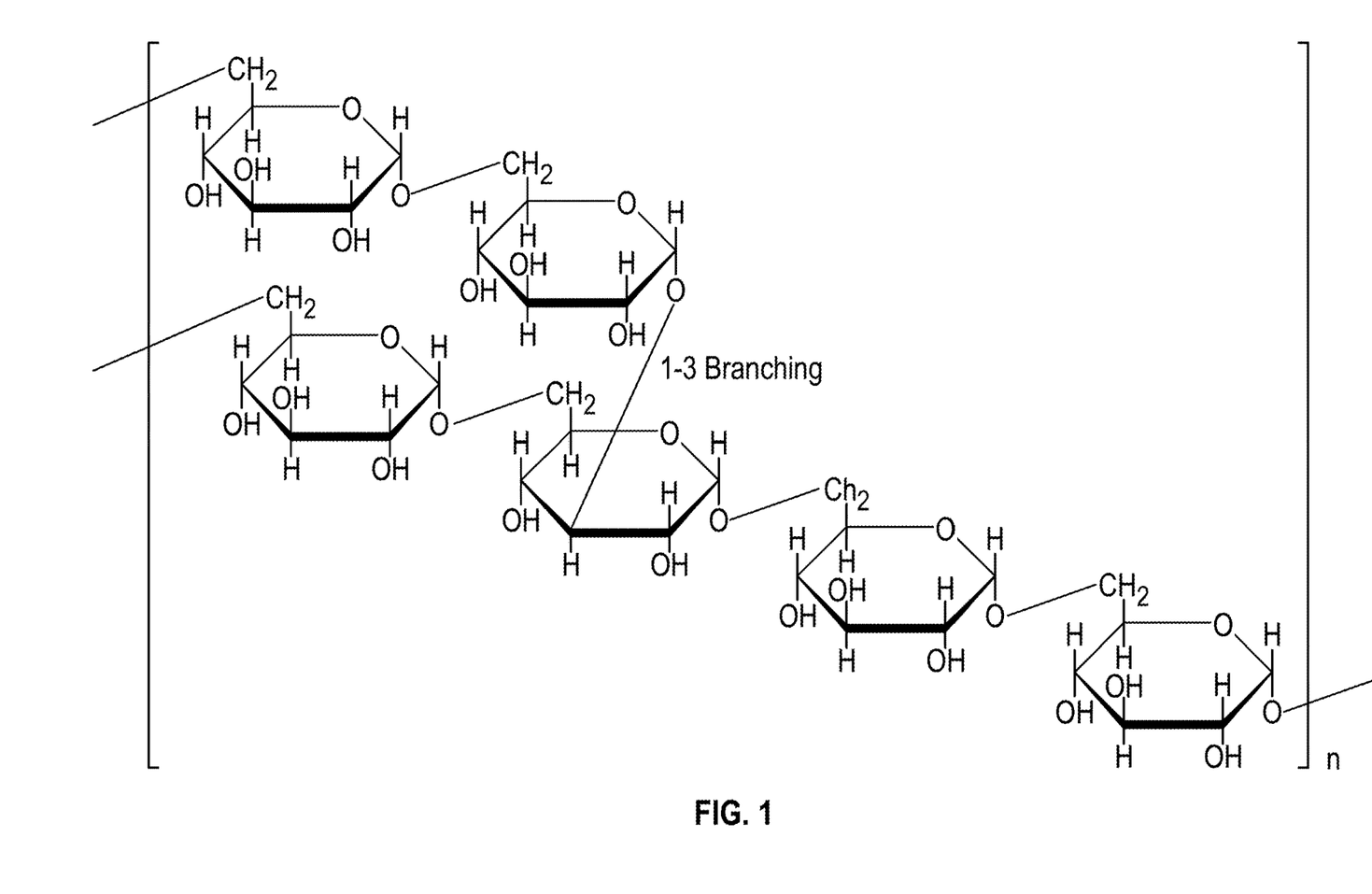
FIG. 1 shows the structure of dextran.

Dextrans are complex branched polysaccharides derived from the condensation of glucose molecules through glycosidic $C_1$-$C_3$ and $C_1$-$C_6$ linkages (FIG. 1). The condensation of monomers proceeds when lactic acid bacteria are added to glucose solutions, the molecular weight being controlled in a very wide range (from 1,000 to 40,000,000 daltons).

As they incorporate glucose molecules in their structure, dextrans display similar reducing behavior as the monomer (mild reducing agents in acidic medium and strong ones in alkaline). The reduction potential for dextran has not been precisely determined but is likely slightly more positive than that of glucose (Eq. 1) due to the sugar molecules interlinking. This makes dextrans weaker reducing agent than the individual sugars.

There has been extensive debate whether the electrons are supplied by a single or (as it is possible for glucose) by multiple carbons in the pyranose ring. It was also debated whether only the end sugar molecules in dextran polymer participate in the reduction process or the intermediate ones as well. It is clear, however, that due to interlinking only the terminal glucose molecules can undergo complete oxidation to preserve the integrity of the macromolecule. This has several important consequences impacting the present patent application.

First, the number of electrons released from molecular dextrans depends on molecular weight. Secondly, when silver ions and dextran are rapidly brought in contact the electrons involved in reduction are released by the reducing groups at the periphery of the macromolecule.

Dextrans have been used recently to reduce silver ions and form silver nanoparticles. The studies refer only to dilute systems (silver concentration less than 0.05%) in which the silver precursor and the dextran were combined together and let react. Due to the high dilution, the systems described do not pose the same challenges as the concentrated system (≥1.0% Ag) described in this patent application in regard to the evolution of pH during the reduction of silver ions. These works also do not disclose whether the silver ions have been reduced completely as the focus was only on the evaluation of the silver nanoparticles not the effectiveness of the reduction process.

The teachings of the present application differ from what is known in the art in several important aspects. Some examples are detailed below.

1. The silver concentration in the precipitation system is at least an order of magnitude higher than what has previously been taught (≥1.0% Ag). This is made possible by selecting conditions (pH, temperature, dispersant amount) which maintain a high reduction rate of silver throughout the precipitation process.
2. The pH of the system is maintained between 12.5 and 13.5 at all times by adding a large excess of base to neutralize the protons released from the reaction and to keep the reduction kinetics unchanged.
3. The temperature necessary for rapid and complete reduction must be between 50 and 75 degrees C., inclusive.
4. Ammonia is used as a complexing agent to maintain a high and constant pH (12.5-13.5) through buffering. For example, silver nitrate is reacted with ammonium hydroxide to form the silver ammonia complex. The ammonia released from the reduction of the latter forms a buffer with a base (e.g., sodium hydroxide) maintaining the necessary high pH throughout the reduction.
5. The silver ions and dextran are prevented to get in contact before establishing conditions for a fast reduction to ensure that silver ions are reduced by the peripheral glucose molecules. Viewed from another perspective, the silver precursor and dextran should not be mixed before conditions for a rapid reaction exist such that the silver ions react with dextran before they have the chance to diffuse inside the macromolecules of dextran. This allows for the use of the molecular weight of dextran as an effective way to tailor the size of silver particles in dispersions (e.g., prepare a dispersion where all of the silver nanoparticles are about 15 nm (e.g., 15±5 nm) using dextran of a first molecular weight, as well as a separate dispersion with all silver particles at about 60 nm (e.g., about 60±10 nm) using dextran of a second molecular weight). As a result, the nucleation rate and thus the particle size can be varied in wide range by changing the molecular weight of dextran. The unexpected consequence of this finding is that, in contrast to what previous studies showed, the particle size decreases with the decrease in the molecular weight of dextran. The explanation of this surprising effect is captured in FIGS. 3A-3B.

Figure 3A:
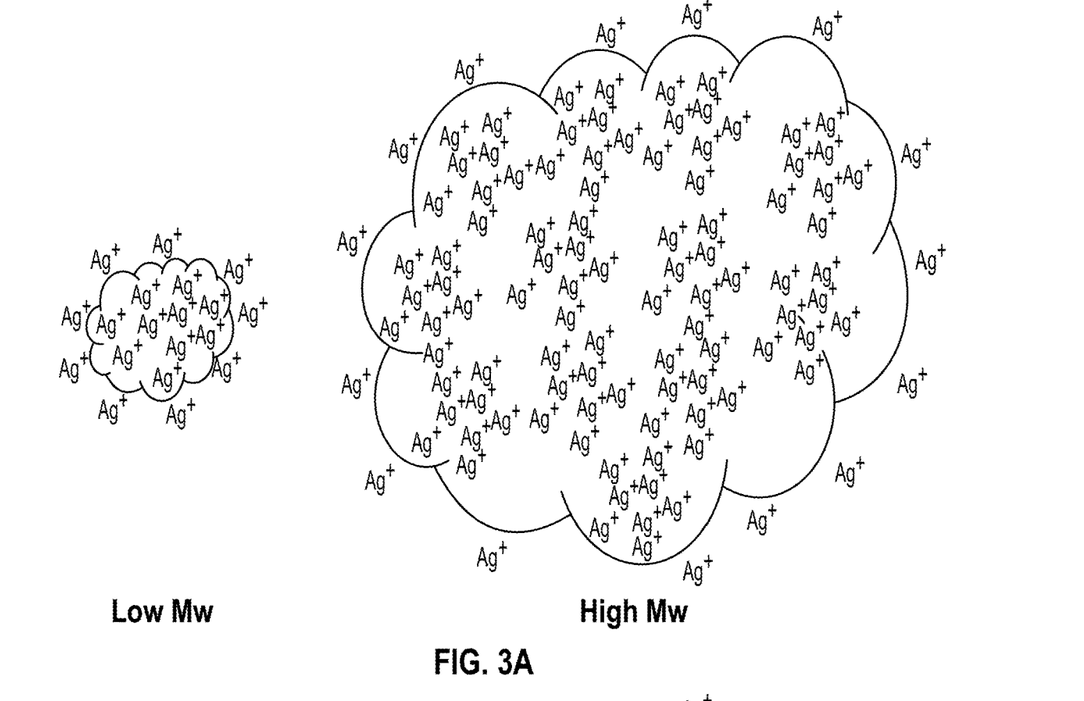
FIGS. 3A-3B show the relative distribution of reacting species in the case of premixed Ag ions and dextran (A); and distribution of the same in the process described in this application (B).

When the silver precursor is mixed with the dextran before conditions for a fast reaction are established (pH below 9.0 and temperature below 40 C), the Ag+ ions have time to diffuse rapidly inside the dextran macromolecule (FIG. 3A). When the reduction starts, the nucleation occurs not only at the periphery of the macromolecule but also inside as the silver ions are in the proximity of the internal reducing functional groups. Because most silver particles form inside the macromolecules in this case (more silver is inside than at the periphery), the final size for small and large Mw dextrans is not very different. The decrease in particle size with molecular weight observed in Carre-Rangel et all., J Nanosci. Nanotechnol. 2015 December; 15 (12):9849-55 is likely due to an increased number of nucleation sites in the case the larger polysaccharide macromolecules, which have a higher volume/external surface ratio.

Figure 3B:
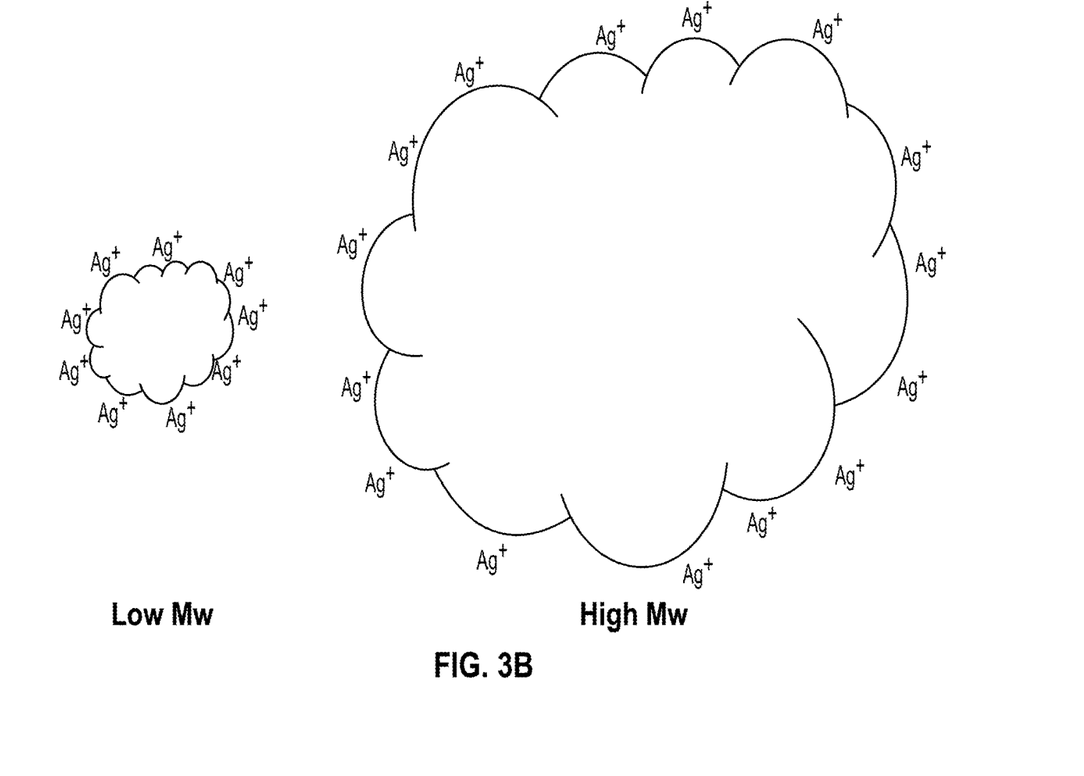

In contrast, in our process silver is added to the dextran in conditions already favoring a fast reduction (high pH, high temperature). The nucleation in this case occurs preponderantly at the periphery of the macromolecules. Since smaller molecular weight dextrans have a higher proportion of peripheral reducing group than larger macromolecules, concentration of silver ions in solution is higher and the immediately available reducing groups are more numerous (larger specific surface area). As a result, the nucleation is faster at lower Mw and the nanoparticles formed smaller. Considering that the molecular weight of dextran can differ by as much as 3 orders of magnitude, the process disclosed in this application is more effective in tailoring the particle size of silver. Indeed, the data provided demonstrate that silver dispersions with plasmon bad maxima from 406 to 460 nm (corresponding to approximate sizes from 15 to 60 nm) can be prepared following the teachings of this patent.

6. The disclosed process teaches the addition of silver precursor into the dextran solution over a controlled time. Changing the addition rate (from minutes to hours) provides an additional 'adjusting knob' in tailoring the kinetics of the reduction and thus the particle size of silver nanoparticles. For the same molecular weight dextran, higher addition rates provide higher silver ions concentration in solution and a faster nucleation. At lower addition rates the slower nucleation yields larger silver nanoparticles.

7. The present patent application teaches that an amount of dextran of at least 100% and up to at least 300% of the weight of precipitated silver should be used to provide good Ag particles uniformity and dispersion stability. Below this proportion not sufficient dextran unaltered in the reduction remains in the system and the silver nanoparticles aggregate due to the high ionic strength.

DETAILED DESCRIPTION

The inventive subject matter is directed to altering the reduction conditions (pH, temperature), the properties of the dextran molecule, and the silver precursor to prepare high concentration, highly stable dispersion of silver nanoparticles with controlled size and uniformity. The approach and product are unique as the approach exploits the cumulated roles as reductant and dispersing agent of dextran and its ability to control particles properties. The precipitation procedure described is simple, controllable, easily implementable, and environmentally friendly at the same time.

The preparation method disclosed in this application surprisingly yields concentrated dispersions of uniform, highly dispersed nanoparticles. The size of the silver nanoparticles can be customized (e.g., ranging in size from 15-60 nm, inclusive) using dextrans of different molecular weight as reducing/dispersing agents.

In an aspect, provided herein is a method of preparing a concentrated dispersion of silver nanoparticles, comprising:
preparing a dextran solution comprising silver or silver ions;
preparing a silver precursor solution; and
mixing the silver precursor solution with the dextran solution under conditions for a rapid reaction wherein the pH is above about 9 and temperature above about 40 degrees Celsius, thereby forming the concentrated dispersion of silver nanoparticles.

In some embodiments, each of the silver nanoparticles has a size within 30% of a size of each of the other silver nanoparticles in the dispersion.

In some embodiments, each of the silver nanoparticles has a size within 20% of a size of each of the other silver nanoparticles in the dispersion.

In some embodiments, the dextran solution comprises dextran of a selected molecular weight suitable to obtain silver nanoparticles of a selected size range.

In some embodiments, the silver precursor solution comprises silver nitrate ($AgNO_3$).

In another aspect, provided herein is a concentrated dispersion of silver nanoparticles wherein each of the silver nanoparticles in the dispersion has a size within 30% of a size of each of the other silver nanoparticles in the dispersion.

Experimental 2.1 Chemicals

The $AgNO_3$ was purchased from Ames Goldsmith Corporation and the Dextran Leuconostoc ($M_r$ 15-25K) from Fluka BioChemika. The ammonium hydroxide, $NH_4OH$, 28% and the sodium hydroxide 10.0N were supplied by Alfa Aesar.

2.2 Reference Experiment 3.5 g of dextran (Mw~20 k) were dissolved for 2 hours at room temperature in 300 ml DI water inside a 1.0 L glass beaker provided with an agitator connected to variable speed mixer. The silver solution was prepared by dissolving 5.5 g of silver nitrate (3.5 g Ag) in 25 ml DI water followed by the addition of ammonium hydroxide solution until the precipitate formed completely re-dissolved. The volume of silver solution was adjusted to 50 ml and 4.3 g NaOH 10N was added to the dextran solution. The temperature of the later was increased to 55° C. and the silver solution was added with a peristaltic pump over 30 minutes under vigorous agitation. The final dispersion with a concentration of 1.0 wt. % Ag was dialyzed to pH 9.5 to obtain a highly stable dispersion suitable for biomedical applications.

2.3. Characterization of Ag Nanoparticles

Figure 4A:
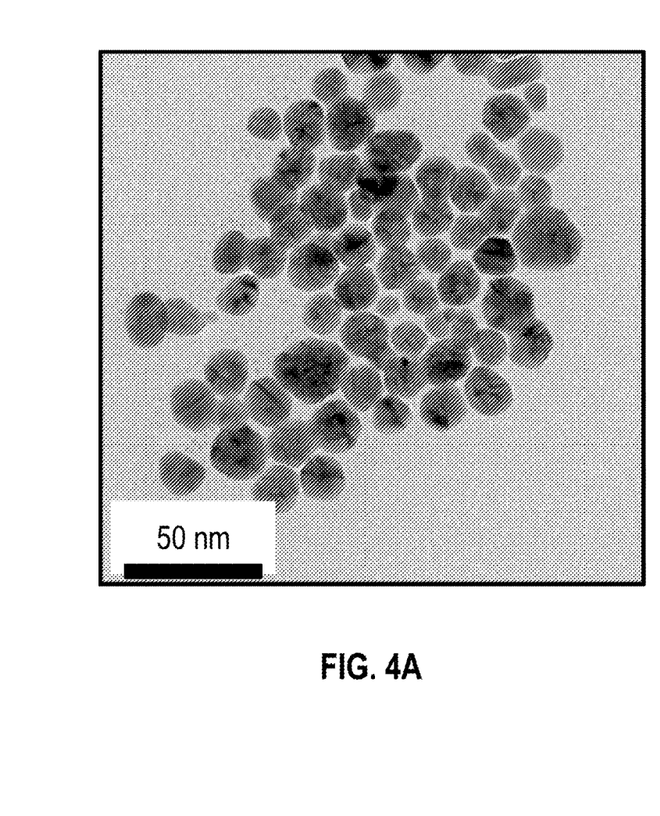
FIGS. 4A-4B show TEM images of Ag nanoparticles obtained in the reference experiment (A); and UV-Vis of dialyzed dispersion diluted 50 times (B).
Figure 4B:
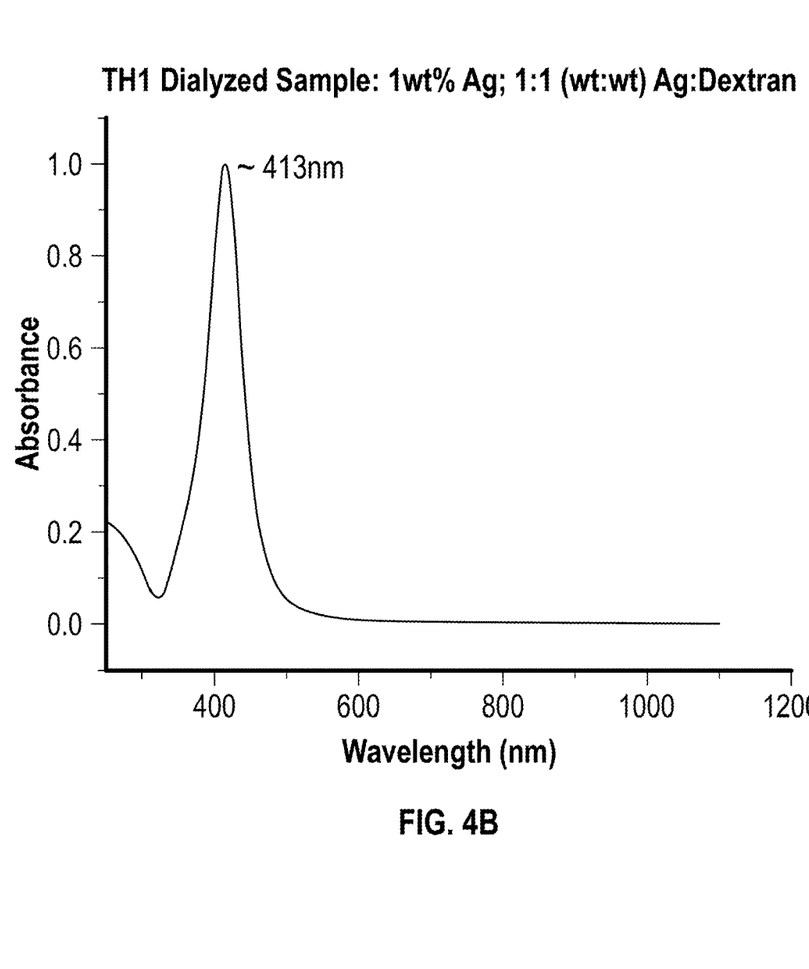

The TEM images of Ag nanoparticles (FIG. 4A) formed in the reference experiment were obtained after transferring the dispersion into an ultracentrifuge tube containing the copper coated grid and spinning it to 10,000 RPM for 10 minutes. The inspection of the rinsed grid revealed the presence of uniform dispersed silver particles with a mean diameter of ~21 nm. The UV-Vis spectrophotometry was performed on a dispersion aliquot diluted 50 times. The spectrum displayed a very narrow plasmon band with a maximum at 413 nm (FIG. 4B). The lack of any background absorption above 500 nm indicated the absence of particles above ~40 nm.

Effect of Molecular Weight of Dextran

Dextrans of different molecular weight (~20 k, 40 k, 250 k and 500 k) were used at the same concentration in the reference experiment. The effect on silver particle size and dispersion is illustrated by the UV-Vis plots in FIG. 5.

Figure 5:
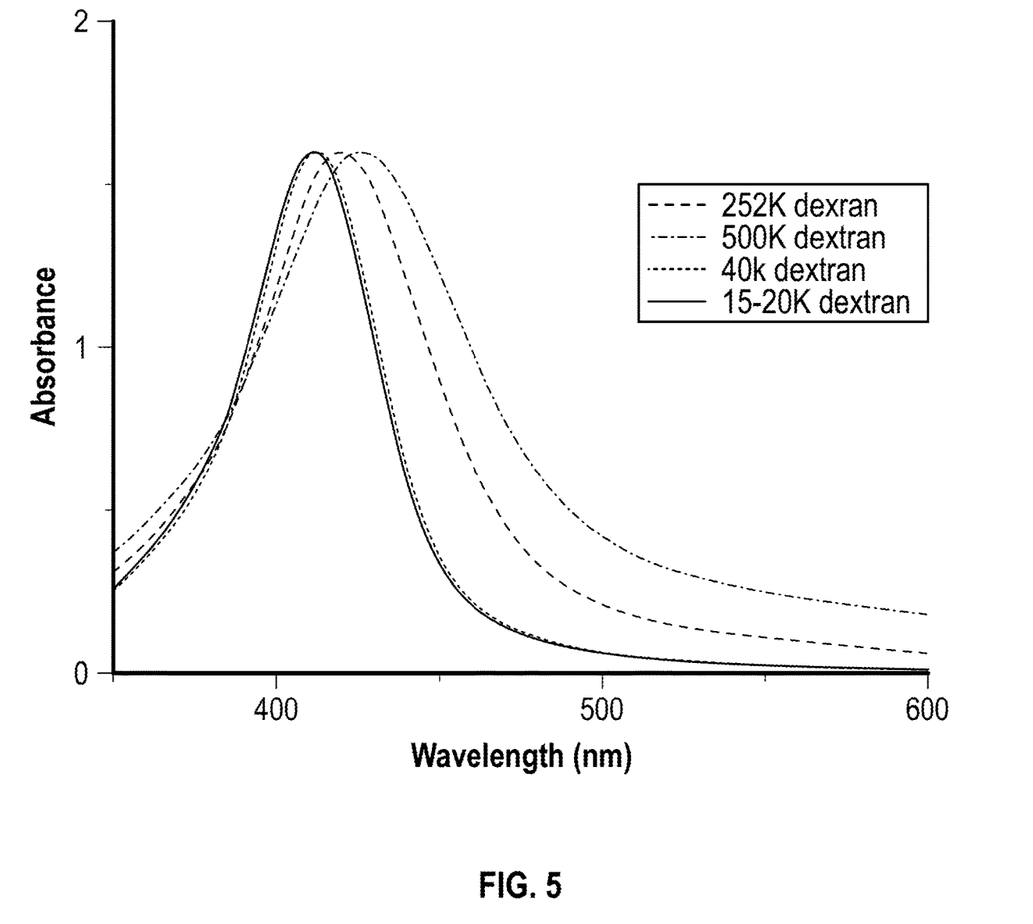
FIG. 5 shows the UV-Vis spectra of Ag dispersions prepared with dextrans of different molecular weight.

A small increase in dextran (from 20 k to 40 k) did not change the peak maximum (413 nm) or its shape. For significantly larger macromolecules (252 k and 500 k) the plasmon bands shifted toward higher wavelengths (to 432 and respectively 451 nm) indicating the presence of progressively larger nanoparticles. This is a surprising effect as in general increasing the molecular weight of the dispersants tends to favor the formation of smaller and better dispersed particles. For this widely accepted trend to be contradicted, the reaction kinetics and the ensuing nucleation must be faster for lower molecular weight dextrans. This appears to be the reason for the unexpected results as the reducing electrons are likely released only (or mostly) by the peripheral glucose molecules as discussed above. Indeed, an order of magnitude increase in the molecular weight of dextran decreases significantly (by a similar magnitude) the number of such reducing groups. Consequently, the reduction of silver will be slower and the particles would increase accordingly, as substantiated by the UV-Vis plots. The fact that in the case of dextran the reduction rate increases with the decrease in molecular weight represents an unexpected discovery. This is of significant practical importance since it makes possible the tailoring in a wide range of the silver nanoparticles size.

Effect of Dextran Amount

Figure 6:
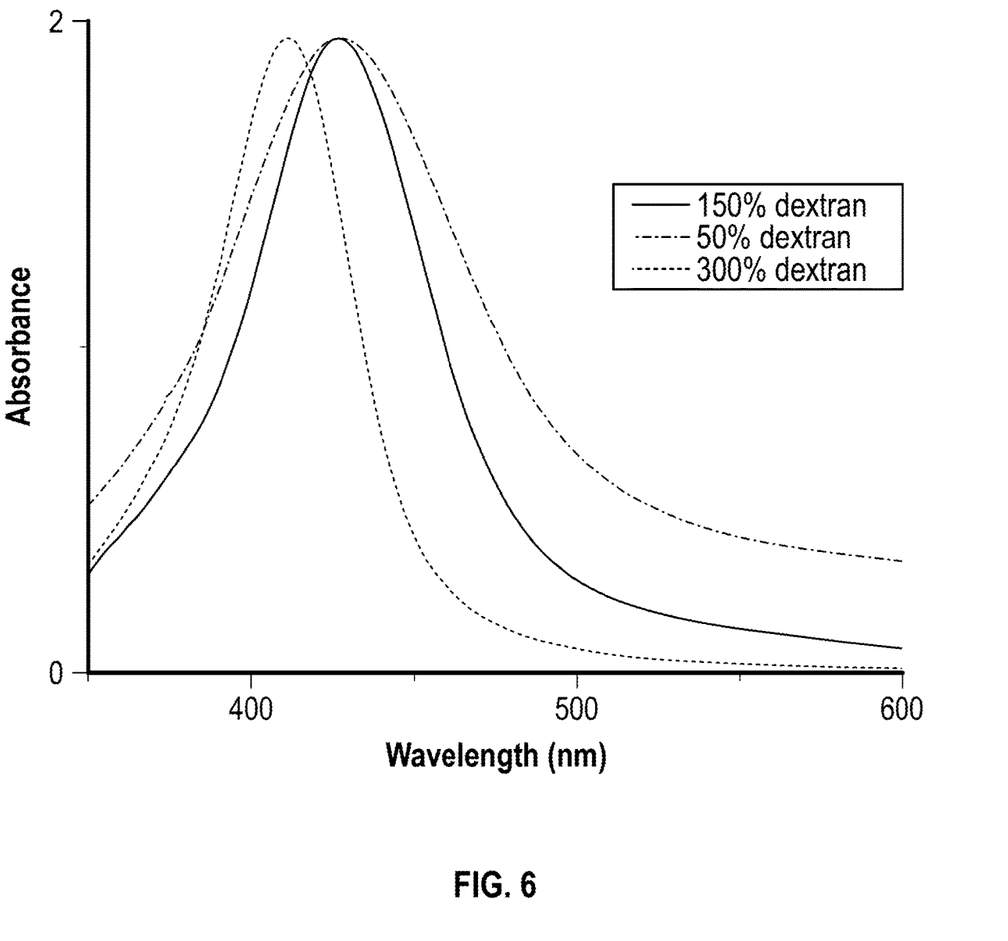
FIG. 6 shows the effect of dextran molecular weight on particle size and dispersion stability.

The effect of the dextran amount was investigated in the case of the 252 k polymer, which at 100% amount generated dispersions having a plasmon band at 432 nm. The conditions were otherwise those of the reference experiment and the UV-Vis data are shown in FIG. 6. When the amount of dextran was reduced by 50%, the position of the maximum did not change but the width of the band increased significantly and a background absorption was recorded even at 600 nm (red plot). This finding suggests that the amount of dextran was insufficient to provide effectively the colloid stabilization function. An increase in the amount by 50% did not alter either the position or the shape of the plasmon band (black plot FIG. 6) when compared to the plot in FIG. 2. At 300% amount of Dextran, the plasmon band moved at 408 nm and its width narrowed. The particles in this case had an average size of 16 nm by SEM. The result can be attributed to a larger amount of dextran that does not react with silver and provides a better colloid stabilization role.

Effect of Silver Concentration

Figure 7:
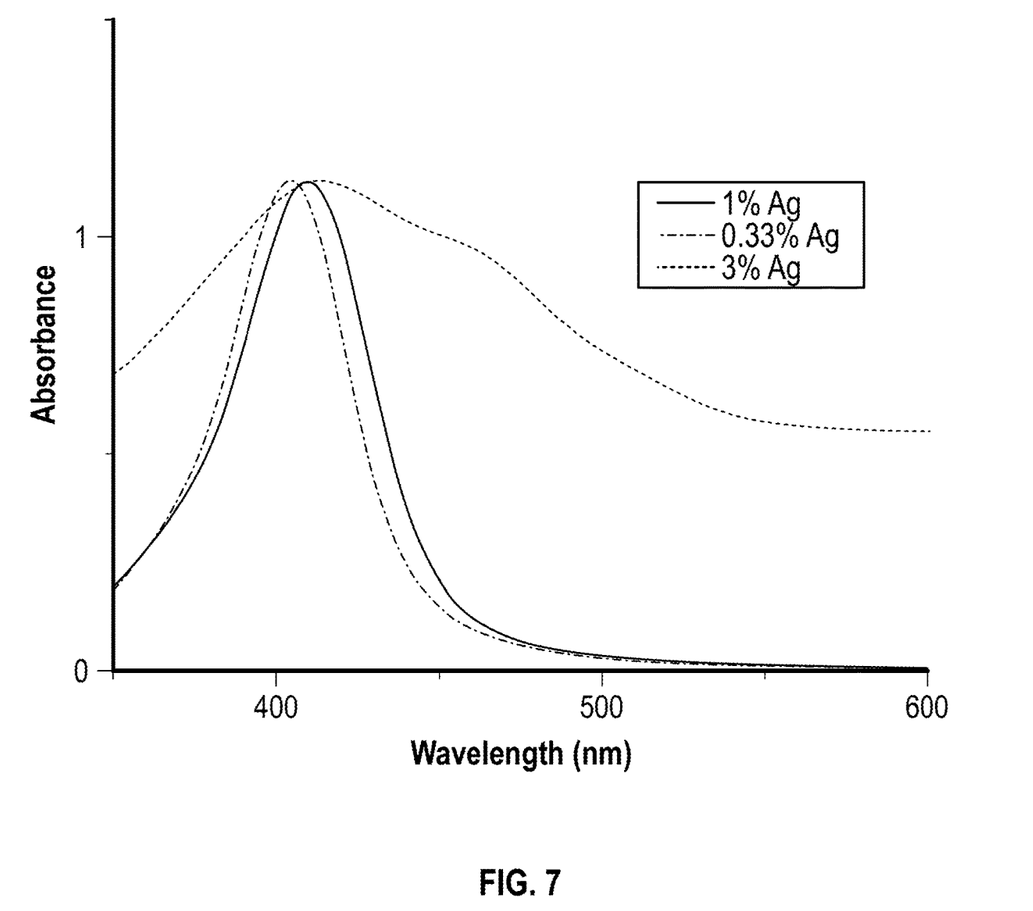
FIG. 7 shows the effect of metal concentration in the dispersion.

In an attempt to optimize the silver concentration at which a highly stable dispersion is still obtained, the concentration of the metal was decreased and respectively increased by a factor of 3 while maintaining the same dextran concentration (FIG. 7). As expected, by decreasing the silver concentration to a third (0.33% Ag) the position of the plasmon band shifted toward lower wavelengths reflecting a decrease in the particle size from 20 to ~15 nm. At three times higher Ag concentration, the dispersion was unstable and the UV-Vis plot showed extended background absorption up to 600 nm indicating the presence of larger aggregates.

While the disclosure has been described in terms of exemplary embodiments, those skilled in the art will recognize that the disclosure can be practiced with modifications in the spirit and scope of the appended claims. The examples given above are merely illustrative and are not meant to be an exhaustive list of all possible designs, embodiments, applications, or modifications of the disclosure.

What is claimed is:

1. A method of preparing a concentrated dispersion of silver nanoparticles, consisting of:
    preparing a dextran solution comprising silver or silver ions;
    preparing a silver precursor solution; and
    mixing the silver precursor solution with the dextran solution under conditions for a rapid reaction wherein a pH is above about 9 and a temperature is above about 40 degrees Celsius, thereby forming the concentrated dispersion of silver nanoparticles.

2. The method of claim 1, wherein each of the silver nanoparticles has a size within 30% of a size of each of the other silver nanoparticles in the concentrated dispersion of silver nanoparticles.

3. The method of claim 1, wherein each of the silver nanoparticles has a size within 20% of a size of each of the other silver nanoparticles in the concentrated dispersion of silver nanoparticles.

4. The method of claim 1, wherein the dextran solution comprises dextran of a selected molecular weight suitable to obtain the silver nanoparticles of a selected size range.

5. The method of claim 1, wherein the silver precursor solution comprises silver nitrate ($AgNO_3$).

* * * * *